June 4, 1935.  T. B. CLARK  2,003,739
WATER SOFTENING APPARATUS
Filed Oct. 15, 1930
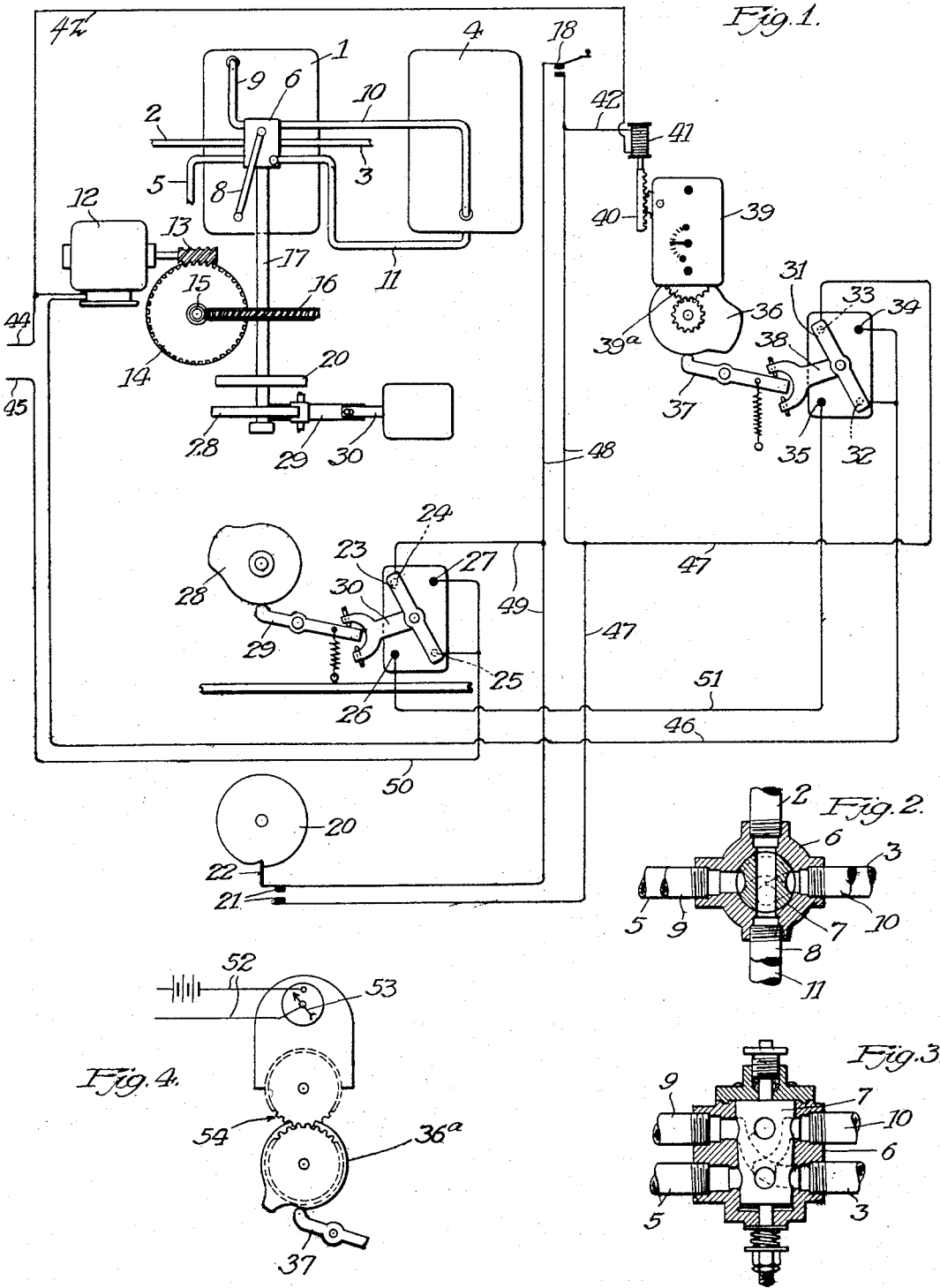
Inventor,
Thomas B. Clark
By Wilson, Dowell, McCanna & Rehm
Attys.
Witness:
R. B. Davison Patented June 4, 1935

2,003,739

UNITED STATES PATENT OFFICE 2,003,739

WATER SOFTENING APPARATUS

Thomas B. Clark, Rockford, Ill., assignor, by mesne assignments, to The Permutit Company, (1934), Wilmington, Del., a corporation of Delaware Application October 15, 1930, Serial No. 488,722

5 Claims. (Cl. 161—7)

This invention aims to provide an improved means for controlling the operation of a base-exchange water softener.

The invention will be understood by reference to an illustrative embodiment thereof shown in the accompanying drawing, in which:

Fig. 1 represents the invention by a composite view which comprises a side elevation of one practicable form of water softening apparatus to which the invention is applied, together with a diagrammatic showing of the operating and controlling means. This diagrammatic illustration includes, in connection with a side elevation of motor-operated means for operating the flow-controlling valve-means of the softener, a diagram of an electrical system for controlling the motor. Included in the diagram are plan views of certain controller devices embodied in the aforesaid side elevation of the motor driven means. Also included in the diagram is a side elevation of a time clock controlled controlling means.

Figs. 2 and 3 are detail horizontal and vertical sectional views respectively of the flow-controlling valve-means embodied in the particular apparatus which is selected for illustration.

Fig. 4 is a detail view of another form of time clock controller.

In the drawing, 1 denotes a water softening tank or container for the usual bed of zeolite or other water softening material, through which the water to be softened normally flows and is delivered as softened water, and through which regenerating solution and water are successively passed to a drain connection for regenerating and cleansing or flushing operations after a suitable period of normal water-softening operation. The circulation system by which the respective liquids for the respective operations are supplied and caused to flow as aforesaid comprises in this instance the water supply pipe 2, connected with a source of water such for instance as a city water main, the delivery pipe 3 for delivering the water to any service line or point of use, a brine tank 4, other piping presently to be mentioned by which brine may be introduced to the container of water softening material, and suitable valve means controlling the system for effecting and maintaining the respective flows. The particular softener selected for illustration is of the type disclosed in U. S. Patent to Harwood et al. No. 1,692,776 of November 20, 1928 in which the flow control system embodies one particular means for furnishing brine or regenerating solution and one particular valve means, namely a rotary multiported valve which in one position establishes communication through the water softening material between the water supply pipe 2 and the delivery or service pipe 3, in another position establishes flow connections for passing brine from the brine tank 4 through the water softening material to the drain pipe 5, and in another position connects the water supply pipe 2 through the water softening material to the drain pipe to permit water from the supply to wash out the regenerating material from the water softening material and the container.

The casing of said valve is indicated at 6 and the valve itself is indicated at 7 in Figs. 2 and 3. The flow in the respective operations may be briefly indicated as follows: In the normal water softening operation the flow is from the water supply pipe 2 through the valve and via pipe 8 to the bottom of the container or softening tank and thence upwardly through the water softening material and out via the pipe 9 and through the valve to the delivery or service pipe 3. In the regenerating operation, the valve being set to connect different ports of the valve casing, the flow is from the water supply pipe through the valve and via the pipe 10 to the brine tank, causing a displacement of brine which flows via pipe 11 through the valve and via pipe 9 to the container and downwardly through the water softening material and out via pipe 8 through the valve to the drain pipe 5. In the cleansing or flushing operation, the valve being again set to connect different ports of the valve casing, the flow is from the water supply pipe through the valve and via the pipe 8 to the bottom of the container and then upwardly through the water softening material and out via the pipe 9 and through the valve to the drain pipe. The next setting of the valve restores the original connection between the water supply pipe and service pipe through the container, for resuming the normal water softening operation.

It will be understood that the particular apparatus above referred to is merely exemplary of one practicable apparatus to which is applied the invention herein described and claimed.

Explanation will now be made of the means for operating and controlling the valve means of the apparatus, represented in this instance by the rotary multi-ported valve 7, in order to cause and control the respective flows.

In the drawing 12 denotes an electric motor which through suitable reduction gearing, represented by worm 13, worm wheel 14, worm 15 and worm wheel 16, is operatively connected with the shaft 17 for operating the valve means, said shaft in this instance being connected to or virtually an extension of the stem of the valve 7. For convenience the shaft whether so connected or otherwise will be referred to as the valve shaft.

The motor is normally inert, its circuit being open. The motor may be started to initiate the regenerating cycle by momentarily closing its circuit through a switch 18. This may be a push button switch which will release the contacts controlled thereby as soon as the switch is released. Or it may be an automatic switch to close periodically or at intervals alternating with appropriate water softening periods, such automatic control now being known to the art. The motor when started will, by the control means presently to be described, turn the valve to position for the regenerating operation and then stop for a period suitable for regeneration. After the determined regeneration period, the motor will automatically resume its operation and turn the valve to the next position for the cleansing, washing or flushing operation, and will then stop for a period suitable for that operation. After a determined period for the cleansing operation, the motor will automatically start again and turn the valve to its original position for the normal water softening operation, it being understood that the flow conditions for the normal operation were disestablished during the regeneration and flushing. The motor, having thus caused the apparatus to pass from normal through the regenerating and flushing operations and back to condition for the normal operation, in an uninterrupted cycle in this instance, stops when the normal position of the valve is restored, and the whole apparatus is reset in readiness for repeating the cycle of operations incident to regeneration when the push button switch 18 is again pushed in. The automatic operation and control of the motor to effect the functions stated in due sequence and order is accomplished by means controlling the motor circuit such for example as represented in the diagram in Fig. 1 and now to be described.

The diagram in Fig. 1 represents the apparatus in the service position. On the shaft 17 is a circuit breaker 20 by which the motor circuit is normally opened at the contacts 21, but which closes the motor circuit at 21 when the motor is first started by the push button switch 18 and maintains it closed throughout the regenerating and flushing operations and until the water softener is again restored to condition for normal operation. This circuit breaker is represented by a notched disk engaged by a spring retracted switch member 22 carrying one of the contacts 21. Normally or during the water softening period the switch member 22 engages the notch of the disk, thereby keeping the motor circuit open as at 21. When the motor starts, the shaft 17 rotates the disk so that the switch member 22 is forced out of the notch, closing the circuit through the contacts 21. During one complete rotation of the shaft 17, in which the regenerating cycle takes place, the circuit is kept closed by the bearing of the switch member 22 on the periphery of the disk 20. At the end of one complete rotation, the cycle having been completed and the water softener being in normal condition, the member 22 snaps back into the notch of the disk, thus breaking the circuit and stopping the motor.

The automatic control of the motor for controlling the periods of regeneration and flushing is accomplished in this instance under clock control by means of two automatic switches, represented as four-pole double throw switches, one of which is controlled by the motor through the shaft 17, and the other of which is controlled by a clock. The first of these switches, which may be conveniently referred to as the valve shaft switch is indicated at 23. Normally it connects circuit terminals at the contacts 24 and 25. When thrown it connects terminals at the contacts 26 and 27. It is operated by means of the valve shaft cam 28 and lever 29, one arm of said lever being in engagement with the cam and the other arm engaging between the bifurcations of a forked lever 30 which carries the said switch 23. The switch lever is spring-held in its normal position.

The other automatic switch controlled by the clock 39 is of similar character. Said switch 31 normally connects circuit terminals at the contacts 32 and 33. When thrown it connects circuit terminals at the contacts 34 and 35. It is operated by the clock operated cam 36 and lever 37 bearing on the cam and engaging between the bifurcations of the forked lever 38 which carries said switch 31.

In the specific embodiment of the invention shown in Fig. 1, the clock 39, which operates the cam 36 through the gearing 39ª, is not intended to run continuously, but only to run for a certain period for the regenerating cycle, which may be for example from ten to thirty minutes, depending upon the capacity and particular design of the softener. In this period, for which the clock is adjusted to operate, the clock will cause one complete revolution of the cam 36. An electrically operated self-winding clock may be employed, the clock being set to wind for operation for the prescribed period desired. For example, the clock winder 40 may be operated by a solenoid 41 connected in series with the starting switch 18 by the circuit lines 42, so that when the motor circuit is closed by the starting switch the clock winder will also be actuated. The same automatic winding of the clock would of course take place if the starting switch 18 were an automatically controlled or periodically operated switch.

The circuit mains or conductors leading from the generator or source of electrical current are indicated at 44 and 45. The apparatus being in the normal position shown, the closing of the starting circuit will close a circuit from the main 44 through the motor via conductor 46, clock controlled switch 31 bridging the contacts 32 and 33, conductor 47, branch lines 48 and included starting switch 18, valve shaft switch 23 bridging the contacts 24 and 25, the conductor 50 to the other main 45. Upon closing this circuit through the starting switch, the motor will start and turn the valve shaft, causing the circuit breaker 20 to close the said circuit at the circuit breaker switch 21. It will be seen that the starting switch and the circuit breaker switch are connected in parallel so that when the circuit is opened at 18 by release of the push button, it remains closed through the circuit breaker switch.

The motor when started will rotate the valve shaft in this instance a quarter turn, thereby disestablishing the flow condition for the normal water softening operation, and establishing the flow condition for the regenerating operation and accordingly causing the flow of the regenerating solution. By this first quarter turn of the valve shaft, the valve shaft cam 28 is caused to throw the double throw four-pole switch 23 to its alternate or reverse position across the contacts 26 and 27. This breaks the circuit and the motor stops. Thereupon the valve will remain in the regenerating position while brine flows into the container. The flow of brine for the regenerating solution will continue for a definite period of time determined by the clock.

At the prescribed time determined by the clock, the clock-operated cam 36 will operate lever 37 to throw the switch 31 to its reverse position across the contacts 34 and 35. Both of the automatic switches 23 and 31 being now in their reverse positions, the motor circuit will be closed from the main 44 through the motor, conductor 46, switch 31 on contacts 34 and 35, conductor 51, switch 23 on contacts 26 and 27, and conductor 50 to the other main 45. In this instance the circuit is connected through the conductor 51 instead of through the circuit breaker switch.

Now the motor will resume its operation and turn the valve shaft another quarter turn, bringing the valve to the position for the washing or flushing operation. In this second quarter turn of the valve shaft, the raised portion of the valve shaft cam 28 will pass from the lever 29, releasing the switch 23 which under spring impulsion will return to its normal position connecting contacts 24 and 25. This again breaks the motor circuit, so that the motor stops and the valve will remain in the flushing position while water from the supply pipe flows through the softening tank or zeolite container to the drain. This flow also continues for a prescribed period of time determined by the clock.

After such prescribed time, the clock having caused the raised portion of the cam 36 to pass from the end of the lever 37, the switch 31 is released and spring-returned to its normal position connecting contacts 32 and 33. Both switches 23 and 31 being now in normal position, the circuit is closed through the motor as first described. So the motor again resumes its operation and turns the valve shaft in this instance a half turn, restoring the valve to its normal position for the normal water softening operation.

The valve shaft having now completed one revolution, the motor circuit is opened by the circuit breaker switch 21, and the motor stops with all the apparatus set in the normal position and in readiness for repetition of the cycle.

In the embodiment of the invention above described the regenerating cycle is initiated by the manual closing of the starting switch 18, with accompanying energization of the clock winder to wind the clock to operate for the prescribed time for which it is designed to run, being the time required for the cycle and during which the clock as aforesaid causes one complete revolution of the cam which controls the time periods for the regenerating and flushing operations. However the clock may be a self-winding continuously running clock which will control the apparatus to initiate regeneration at predetermined intervals. This may be accomplished by employing the clock to periodically close the starting circuit and for operating through suitable gearing a cam of different form from that shown in Fig. 1 and which will make only one revolution per period of normal water softening operation and will be in position to exercise its control at the end of the normal period. For example, as shown in Fig. 4, a circuit 52 for starting the regeneration either directly or through any suitable relay device not shown, may be periodically and temporarily closed by a clock hand 53. At the time the clock hand makes the contact to close this circuit, the clock-operated gearing diagrammatically represented at 54 will have brought the cam 36ª to a point where its raised portion is approaching the lever 37 for operating the switch 31. Thus the flow for the regenerating operation will continue until said cam operates said lever; and then, the motor being operated to shift the valve to the flushing position, the flow for flushing or cleansing will continue until the cam projection has passed the lever, whereupon the switch 31 is thrown to start the motor for the shifting of the valve back to softening position.

What I claim as my invention, and desire to secure by Letters Patent, is:

1. In a regenerative base exchange water softening apparatus including a softening chamber, a source of brine, the necessary connecting conduits for carrying out the several regenerative operations and return to softening with valve means controlling said conduits and a valve operating shaft adapted in being turned through a single complete revolution to shift said valve means to the several positions for said regenerative operations and return to softening, improved automatic means for timing said valve shifts which comprises an electric motor for turning said shaft, an electric circuit for said motor, a starting switch in said circuit adapted to start the motor to shift the valve means from softening to the first regenerative position, a time clock, two doubleway spring switches connected in series in said circuit, means actuated by the valve operating shaft whereby one of said switches is moved to break the motor circuit after two succeeding valve shifts, means actuated by the time clock whereby the other of said doubleway switches is moved to reestablish the motor circuit at predetermined times so as to start the motor shifting the valve means to a succeeding regenerative position and to the softening position, and circuit closing and breaking means actuated by the valve operating shaft at the beginning and end of each single complete revolution thereof.

2. In the organization of claim 1, an electromagnetic solenoid in parallel circuit with the motor and adapted to be energized upon closing of the motor circuit by the starting switch and means actuated by said solenoid for winding the time clock.

3. In the organization of claim 1, a starting switch operatively connected to the time clock, the time clock being of a continuously running type.

4. In a base exchange water softening apparatus having a softening chamber with conduit connections for softening, regenerating and washing, valve means controlling said conduits and an operating shaft adapted in being turned through a single complete revolution to shift said valve means to the several positions for regenerating, washing and return to softening, automatic means for timing said valve shifts comprising an electric motor for turning said shaft, an electric circuit for said motor, a starting switch in said circuit adapted to start the motor to shift the valve means from softening to regenerating position, a time clock, two two-way spring switches connected in series in said circuit, means whereby one of said spring switches is moved by the valve operating shaft to stop the motor after the valve means is shifted from softening to regenerating position and released to stop the motor after the valve means is shifted from regenerating to washing position, means whereby the other of said two-way switches is moved by the time clock to start the motor to shift the valve means from regenerating to washing position and released to start the motor to shift the valve means from washing to softening position and circuit closing and breaking means actuated by the valve operating shaft at the beginning and end of each single complete revolution thereof.

5. In a water softening apparatus as described in claim 4, valve means comprising a single multiway valve having its stem operatively connected to the operating shaft moving and releasing the switch to stop the motor.

THOMAS B. CLARK.